(12) United States Patent
Kao

(10) Patent No.: US 8,720,304 B1
(45) Date of Patent: May 13, 2014

(54) BICYCLE CRANK ASSEMBLY

(71) Applicant: Yu-Sheng Kao, Changhua (TW)

(72) Inventor: Yu-Sheng Kao, Changhua (TW)

( * ) Notice: Subject to any disclaimer, the term of this patent is extended or adjusted under 35 U.S.C. 154(b) by 0 days.

(21) Appl. No.: 13/724,950

(22) Filed: Dec. 21, 2012

(51) Int. Cl.
*B62M 3/00* (2006.01)

(52) U.S. Cl.
USPC ...................................... 74/594.1

(58) Field of Classification Search
USPC .................. 74/594.1, 594.2, 594.3, 594.4
See application file for complete search history.

(56) References Cited

U.S. PATENT DOCUMENTS

| | | | |
|---|---|---|---|
| 7,856,903 B2 * | 12/2010 | Yamanaka et al. | 74/594.1 |
| 2005/0081678 A1 * | 4/2005 | Smith et al. | 74/594.1 |
| 2006/0053962 A1 * | 3/2006 | Chiang | 74/594.1 |
| 2007/0062328 A1 * | 3/2007 | Shiraishi et al. | 74/594.1 |
| 2007/0151410 A1 * | 7/2007 | Meggiolan | 74/594.1 |

* cited by examiner

*Primary Examiner* — Vicky Johnson
(74) *Attorney, Agent, or Firm* — Muncy, Geissler, Olds & Lowe, P.C.

(57) ABSTRACT

A bicycle crank assembly of bicycle cranks and axle includes a first crank having a first hole which has a first open end and a second open end opposite the first open end. A first protrusion extends from the inner periphery of the first open end and a second protrusion extends from the first protrusion. The second protrusion has a first restriction face. An axle extends through the first crank and has a third end and a fourth end opposite the third end. The third end has a fixing portion on the outside thereof. The fixing portion has a recessed portion defined in the connection area with the axle. The recessed portion has a second restriction face which is matched with the first restriction face so as to evenly share the stress.

6 Claims, 17 Drawing Sheets

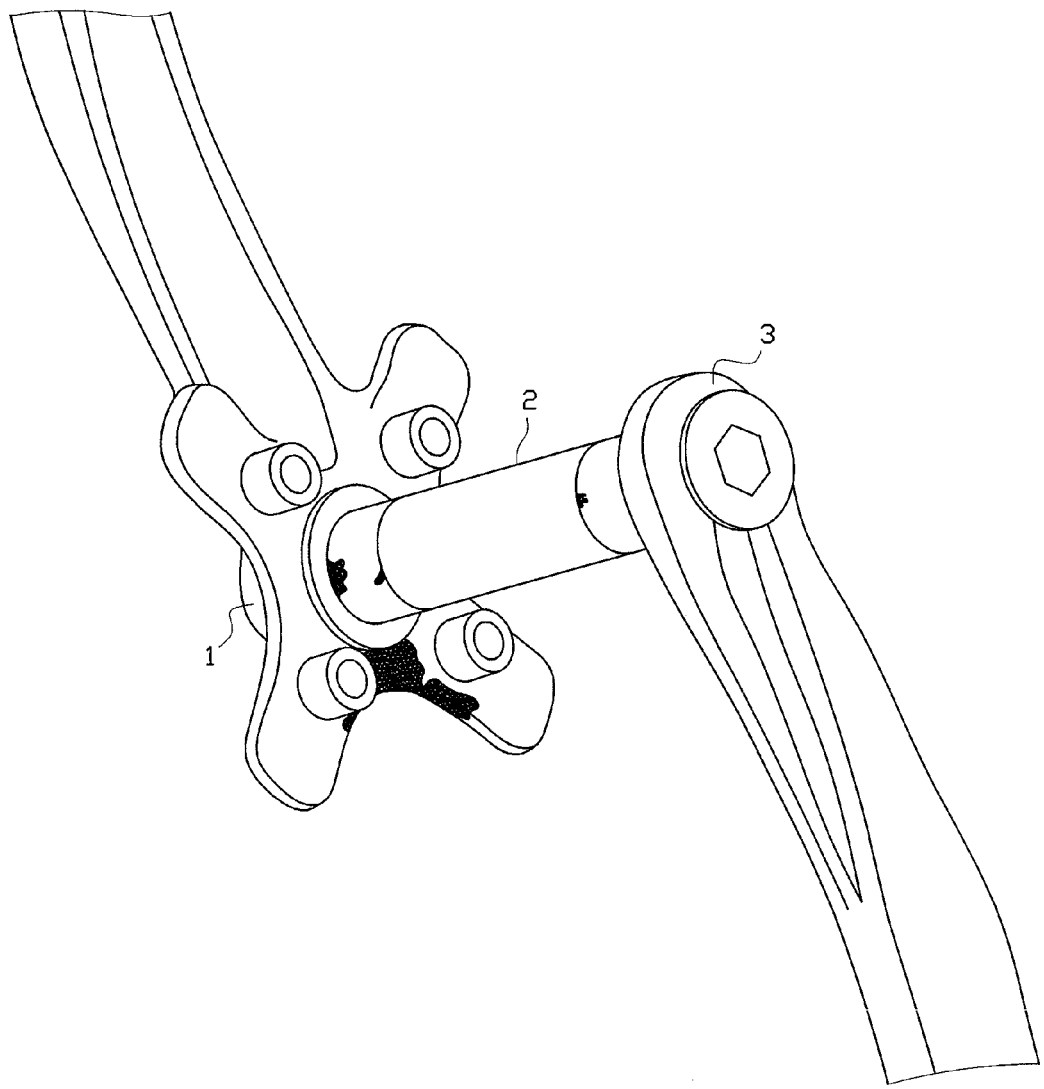
F I G . 9

BICYCLE CRANK ASSEMBLY

FIELD OF THE INVENTION

The present invention relates to a bicycle crank assembly, and more particularly, to a connection between the bicycle cranks and the axle, and the connection evenly shares the stress.

BACKGROUND OF THE INVENTION

The conventional bicycle crank assembly comprises a bottom bracket through which an axle extends, and two cranks are respectively connected to the two ends of the axle. A chainwheel is connected to the bottom bracket so that when the cranks are operated, the power is transferred to the wheel by the chainwheel, the chain and the gear on the rear wheel.

China Publication No. 101204984 discloses a bicycle crank assembly as shown in FIG. 11 and comprises a connecting tube "A" with an axle "C" extends therethrough, and two cranks "B" are respectively connected to the two ends of the axle "C". The axle "C" is a hollow axle to reduce the weight. A protrusion "C1" is formed on the first end of the axle "C" and contacts the protrusion "B1" on the crank "B" in longitudinal direction to securely connect the crank "B" to the axle "C". The longitudinal force is transferred to the protrusion "B1" via the protrusion "C1", and then to the second end of the axle "C" and the other crank "B". The force eventually is transferred to the bearing unit.

However, the longitudinal force is concentrated from the outside toward the inside of the combination, and the protrusion "C1" is the beginning point of the longitudinal force. The longitudinal force is reduced because tight fit between the parts of the combination. The concentration of the stress may break the axle "C". FIG. 12 shows the cross sectional view of the crank and the axle. The application of the maximum stress to the two cranks and the axle is disclosed in FIG. 14. FIGS. 15, 16 and 17 are cross sectional views to show the application of the maximum stress to the two cranks and the axle. When a gap is formed between the protrusion "C1" and the protrusion "B1", the longitudinal force cannot be performed as desired and the parts may slide, shift and loose. Besides, the protrusion "C1" is exposed and cannot prevent water, rain or corrosive liquid from entering the combination. Therefore, the existed connection between the cranks and the axle needs to be improved.

SUMMARY OF THE INVENTION

The present invention relates to a bicycle crank assembly, and comprises a first crank having a first hole which includes a first open end and a second open end opposite the first open end. A first protrusion extends from the inner periphery of the first open end and a second protrusion extends from the first protrusion. The second protrusion has a first restriction face. A first stop is defined in the inner periphery of the second open end. An axle extends through the first crank and has a third end and a fourth end opposite the third end. The third end has a fixing portion on the outside thereof and the fixing portion has a recessed portion defined in the connection area with the axle. The recessed portion has a second restriction face which contacts the first restriction face. The fixing portion has a groove and an O-ring is engaged with the groove. The O-ring contacts the first stop.

Preferably, the first and second restriction faces are matched with each other by two respective curved portions.

Preferably, the first crank has a first crank body extending therefrom.

Preferably, the axle is a hollow axle.

Preferably, the fourth end has a threaded hole and a locking member is threadedly connected to the threaded hole.

Preferably, a second crank is fixed to the fourth end of the axle and has a second hole. The second hole has a fifth open end and a sixth open end opposite the fifth open end. The fifth open end has a second stop. The second crank has a second crank body extending therefrom.

In one aspect of the present invention, the first protrusion and the fixing portion are connected to each other so as to have a larger contact area which is benefit for bearing larger force.

In another aspect of the present invention, the first and second restriction faces are snugly matched to each other so that the stress can be evenly shared. The longitudinal force is sufficient to combine the parts.

In further another aspect of the present invention, the O-ring in the groove contacts the first stop of the first crank to prevent water, rain or corrosive liquid from entering the bicycle crank assembly.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 9 is another perspective view opposite the viewing surface of FIG. 7 to show the maximum stresses distributed on the outside of the present invention;

DETAILED DESCRIPTION OF THE PREFERRED EMBODIMENT

Figure 1:
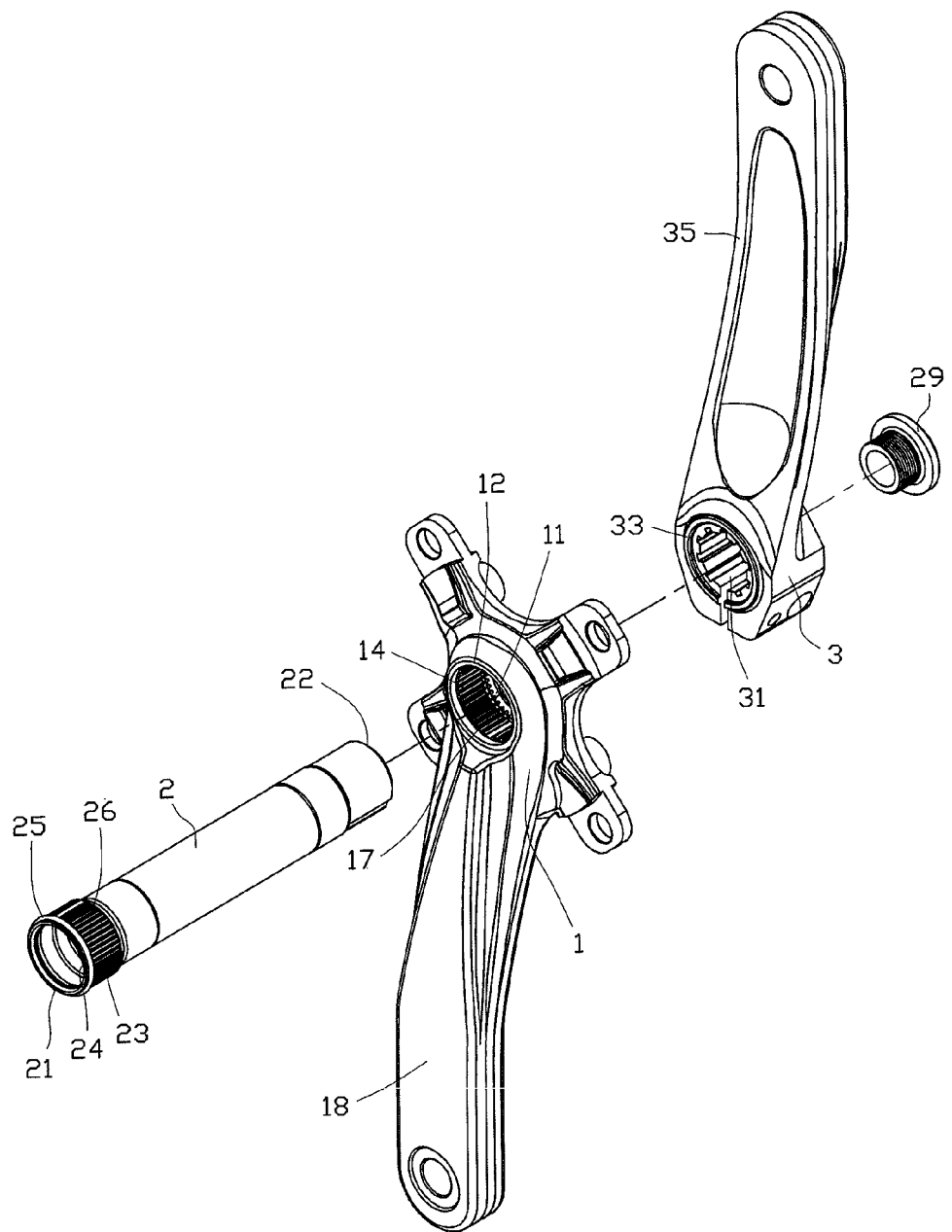
FIG. 1 is an exploded view to show a bicycle crank assembly of the present invention.
Figure 2:
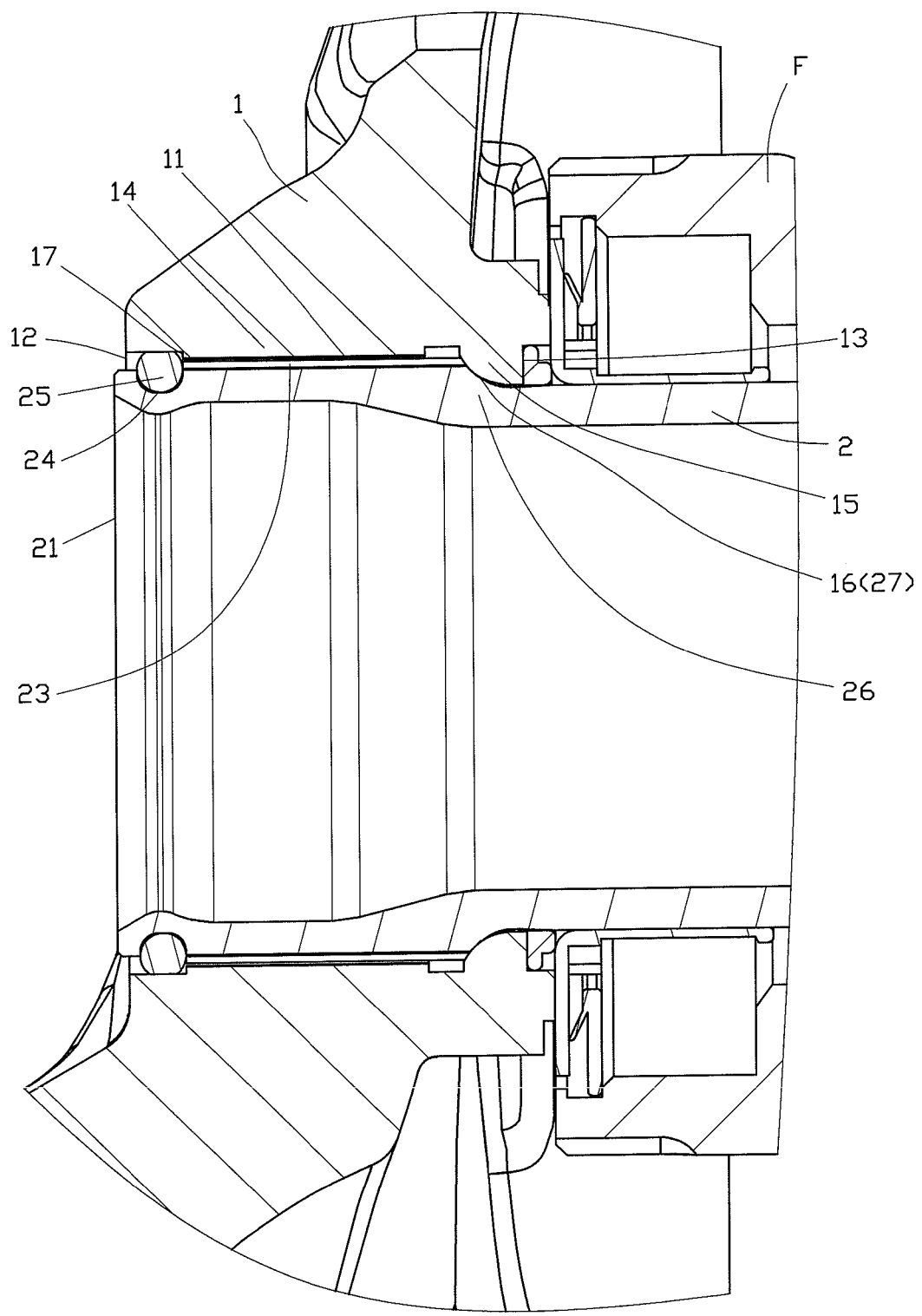
FIG. 2 is an enlarged partial cross sectional view to show the bicycle crank assembly of the present invention with a connecting tube.

Referring to FIGS. 1 and 2, the bicycle crank assembly the present invention comprises a first crank 1 having a first hole 11, and the first hole 11 has a first open end 12 and a second open end 13 opposite the first open end 12. A first protrusion 14 extends from the inner periphery of the first open end 12 and a second protrusion 15 extends from the first protrusion 14. The second protrusion 15 has a first restriction face 16 which is a rounded face. A first stop 17 is defined in the inner periphery of the first open end 12. The first crank 1 has a first crank body 18 extending therefrom.

An axle 2 extends through the first crank 1 and the axle 2 is a hollow axle. The axle 2 has a third end 21 and a fourth end 22 opposite the third end 21, wherein the third end 21 has a fixing portion 23 on the outside thereof. The fixing portion 23 has a groove 24 and an O-ring 25 is engaged with the groove 24. The O-ring 25 contacts the first stop 17 of the first crank 1. The fixing portion 23 has a recessed portion 26 defined in the connection area with the axle 2, wherein the recessed portion 26 has a second restriction face 27 which is a rounded face and is snugly matched with the first restriction face 16. The fourth end 22 has a threaded hole 28 and a locking member 29 is threadedly connected to the threaded hole 28 as shown In FIG. 4.

A second crank 3 is fixed to the fourth end 22 of the axle 2 and has a second hole 31 which has a fifth open end 32 and a sixth open end 33 opposite the fifth open end 32. The fifth open end 32 has a second stop 34. The second crank 3 has a second crank body 35 extending therefrom.

Figure 3:
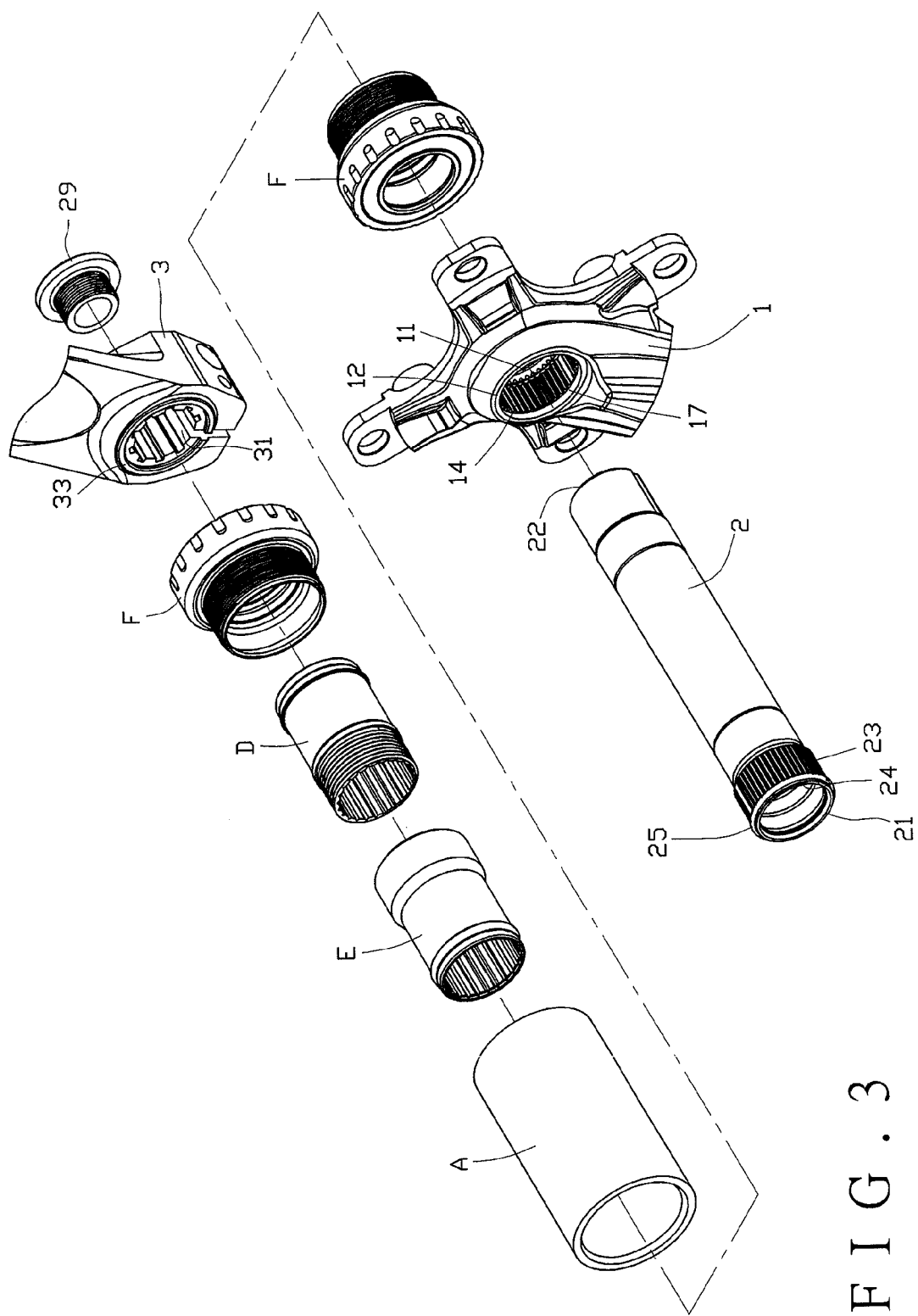
FIG. 3 is an exploded view to show that the bicycle crank assembly of the present invention with the connecting tube.
Figure 4:
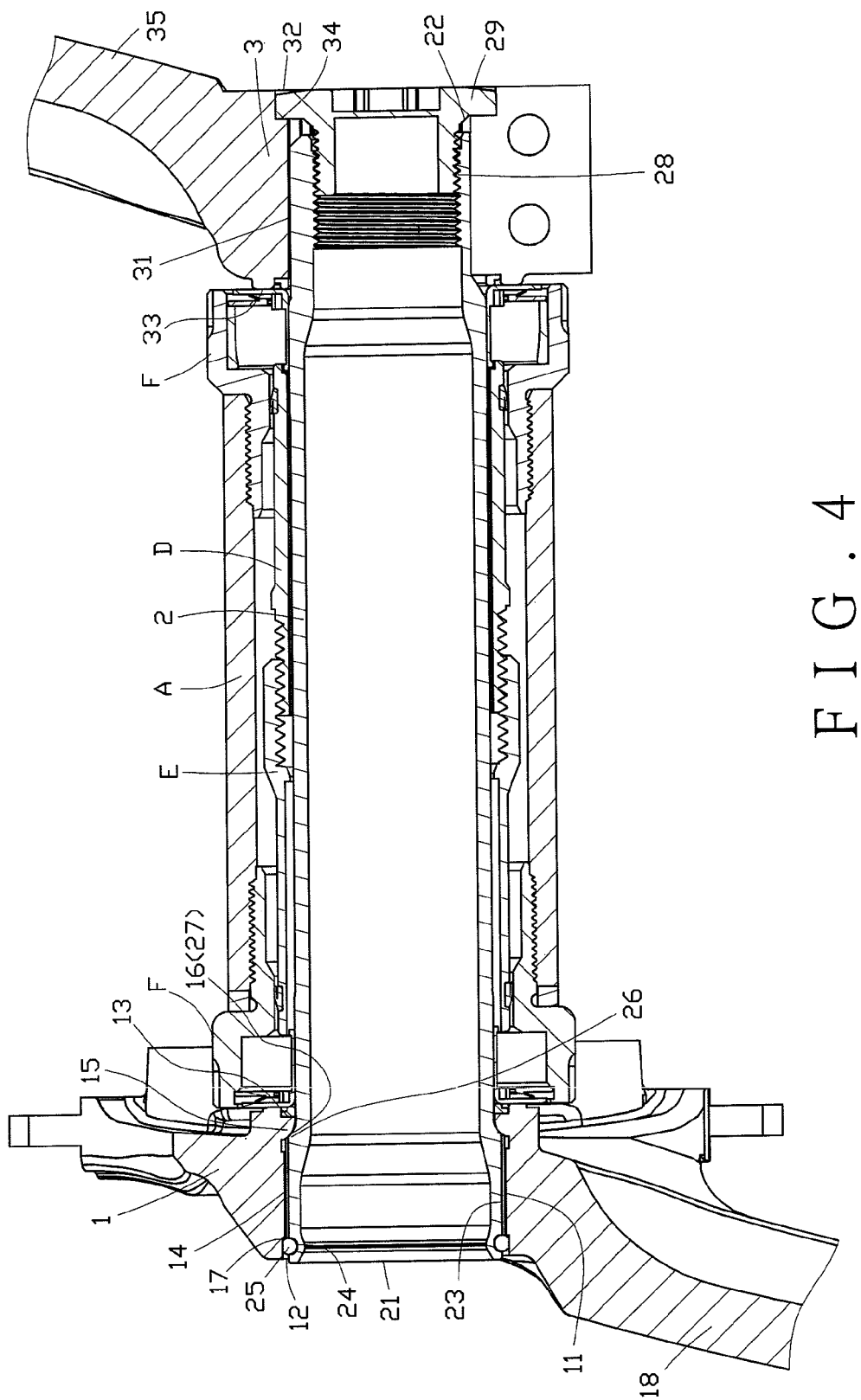
FIG. 4 is a partial cross section view of the bicycle crank assembly of the present invention installed to the connecting tube.
Figure 5:
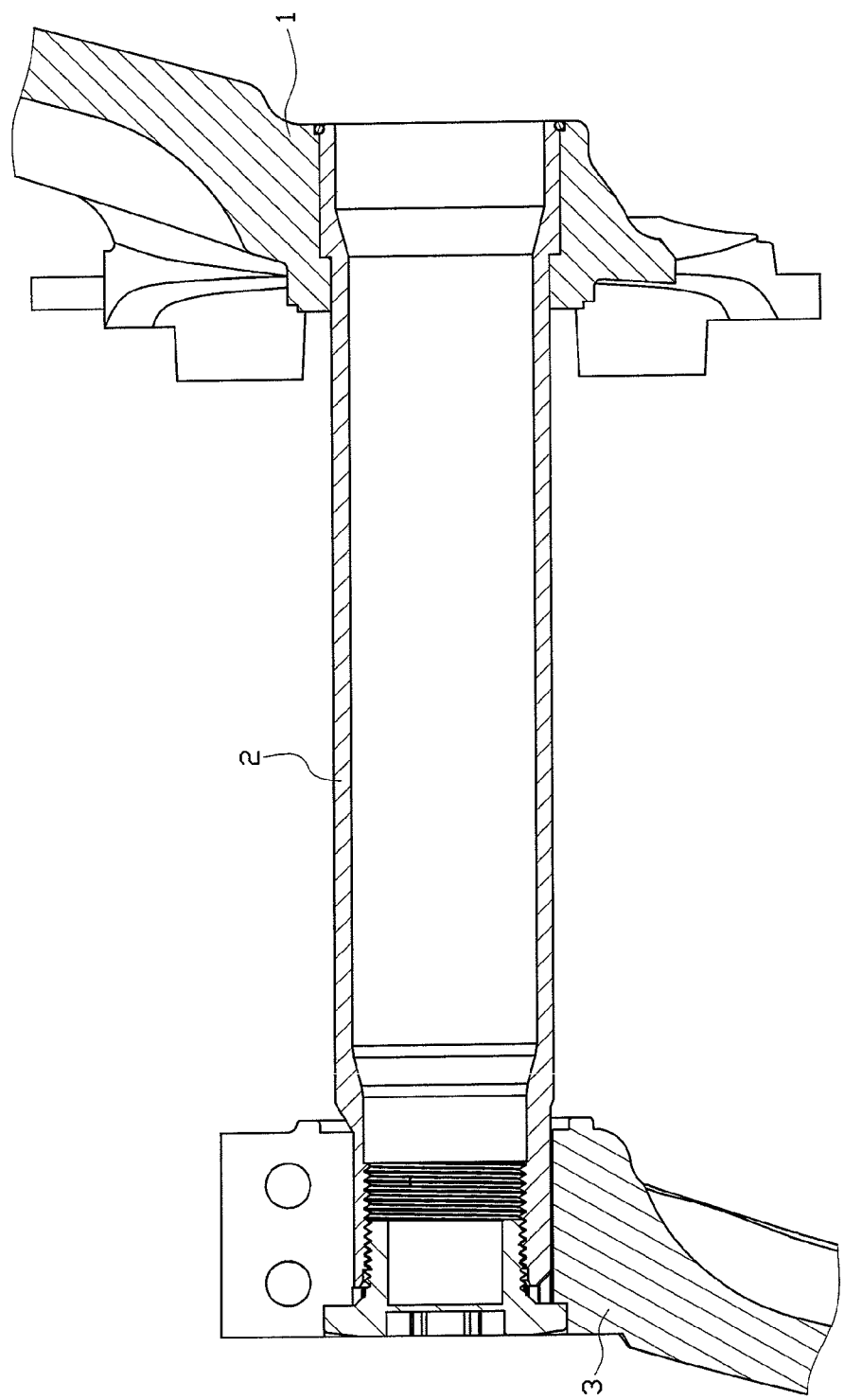
FIG. 5 is a partial cross section view of the present invention to show the first crank is connected with the axle.
Figure 6:
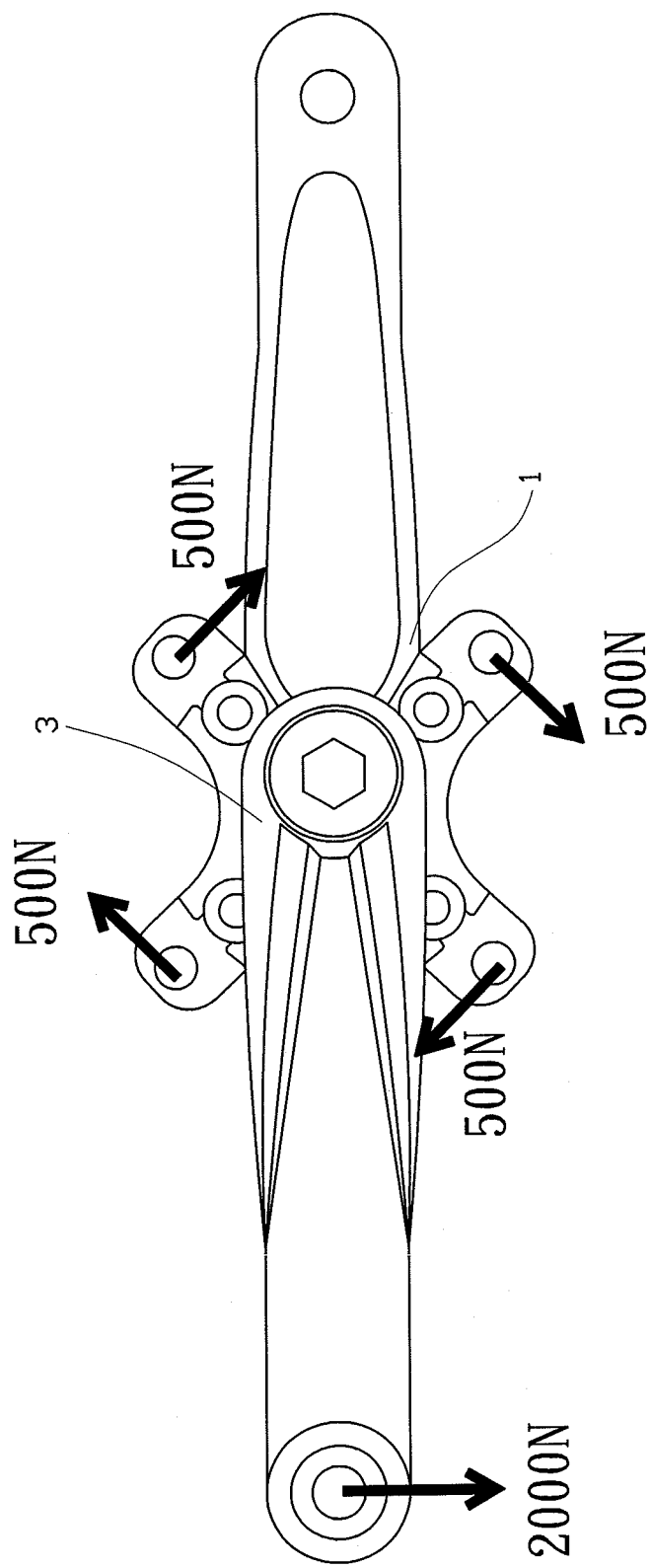
FIG. 6 shows the forces applied to the first crank of the present invention.
Figure 7:
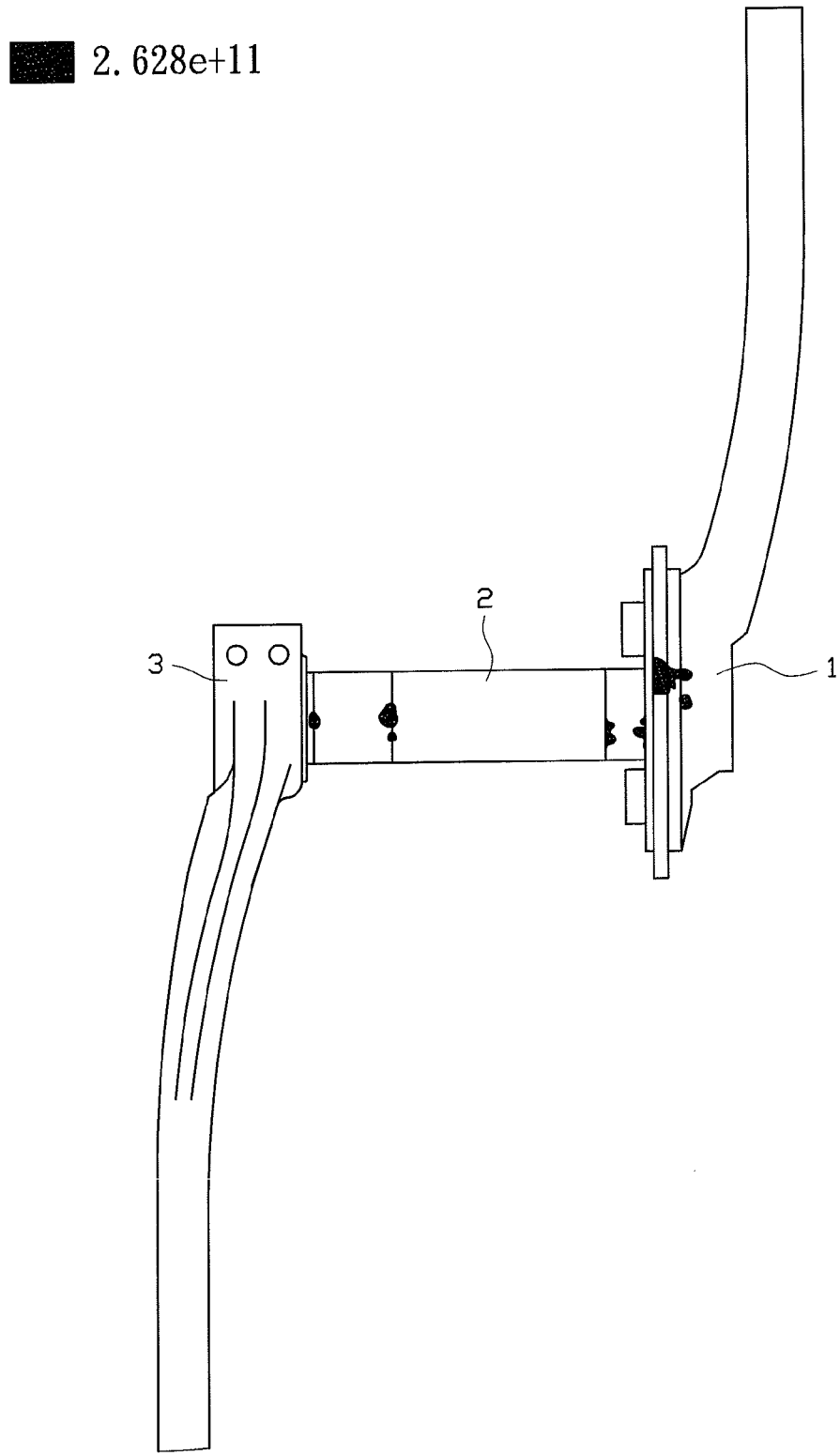
FIG. 7 is a perspective view to show the maximum stresses distributed on the outside of the present invention.
Figure 8:
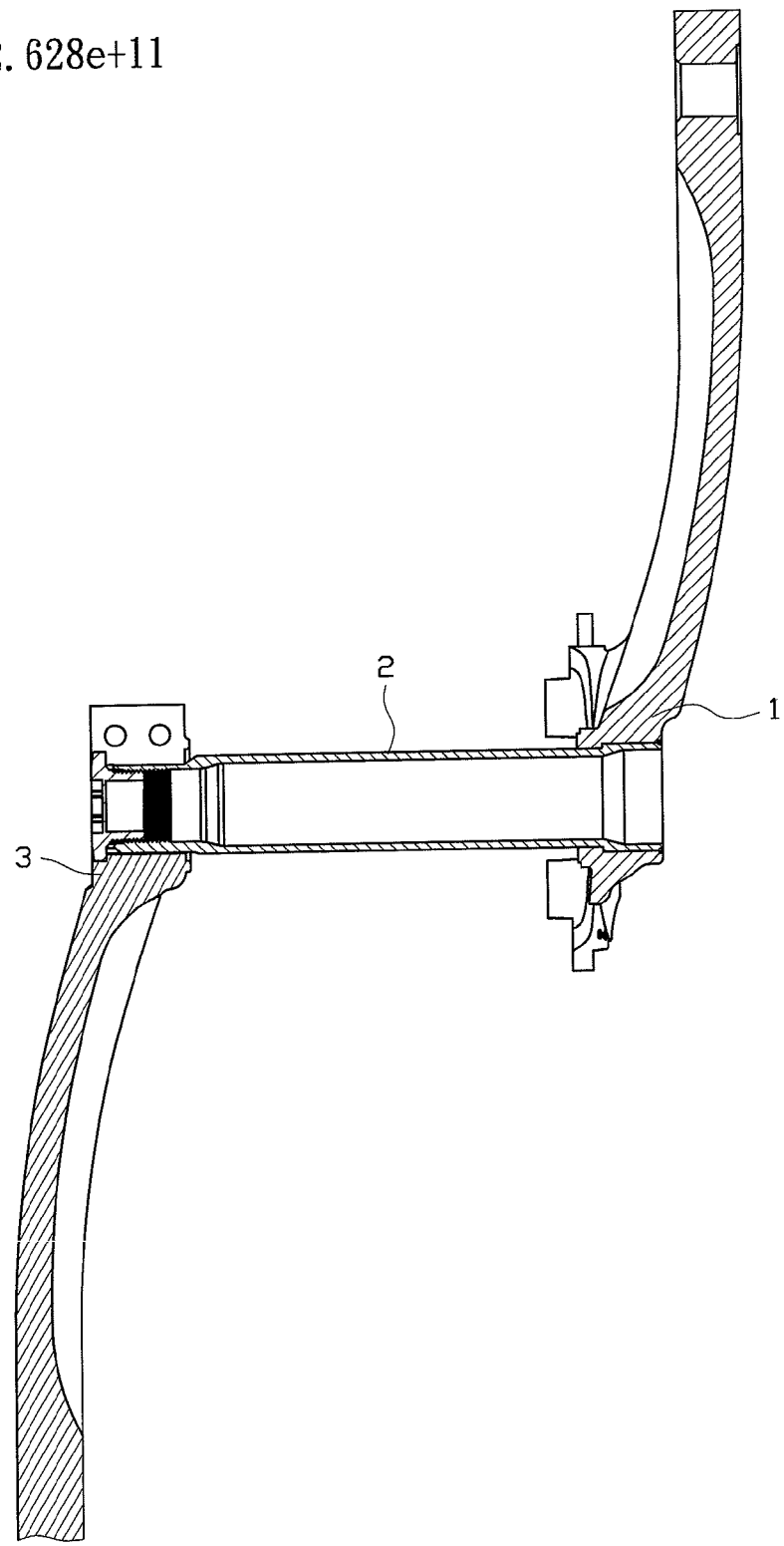
FIG. 8 is a cross sectional view to show the maximum stresses distributed on the inside of the present invention.
Figure 10:
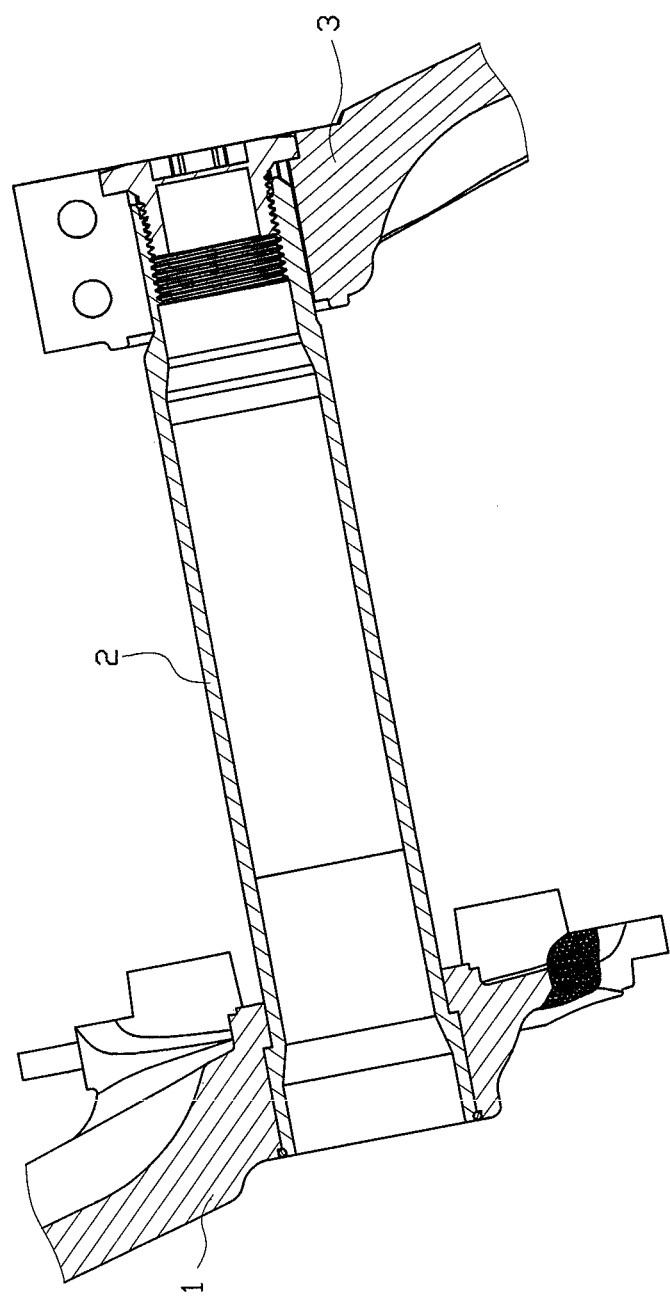
FIG. 10 is another cross sectional view opposite the viewing surface of FIG. 8 to show the maximum stresses distributed on the inside of the present invention.
Figure 11:
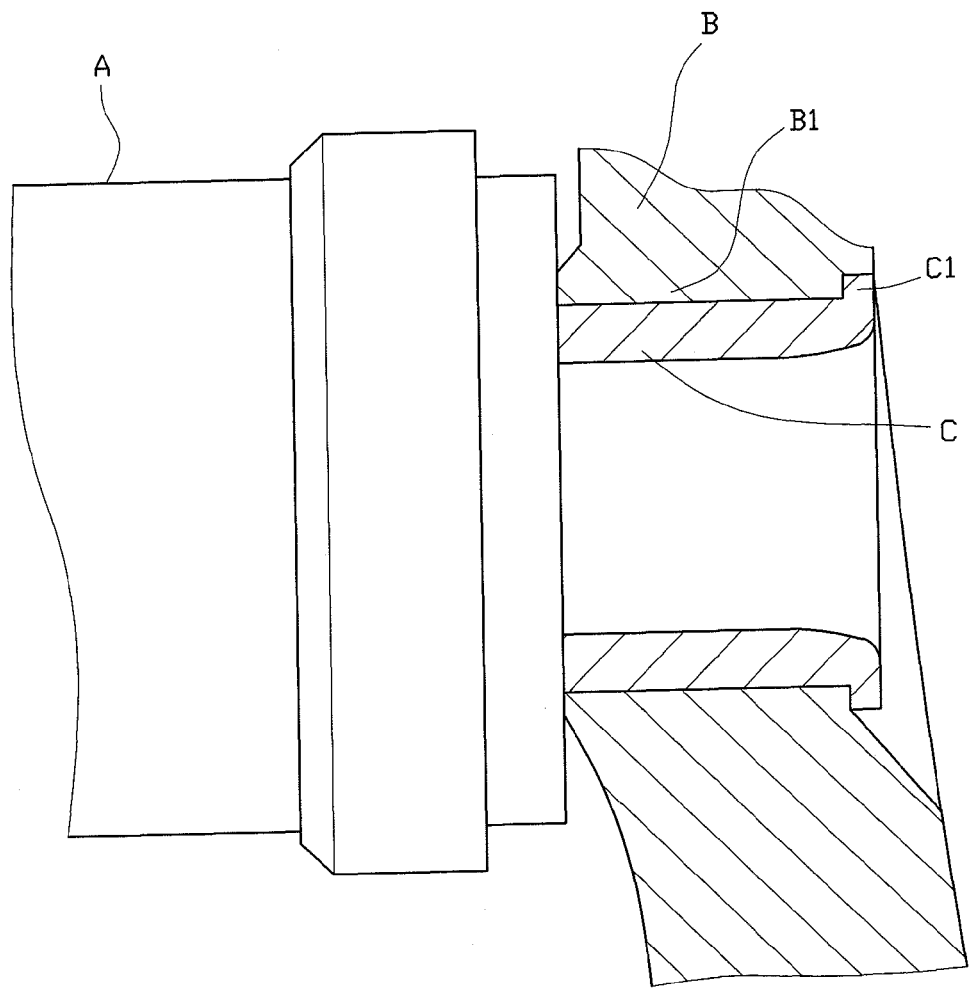
FIG. 11 is a partial cross sectional view of the conventional bicycle crank assembly.
Figure 12:
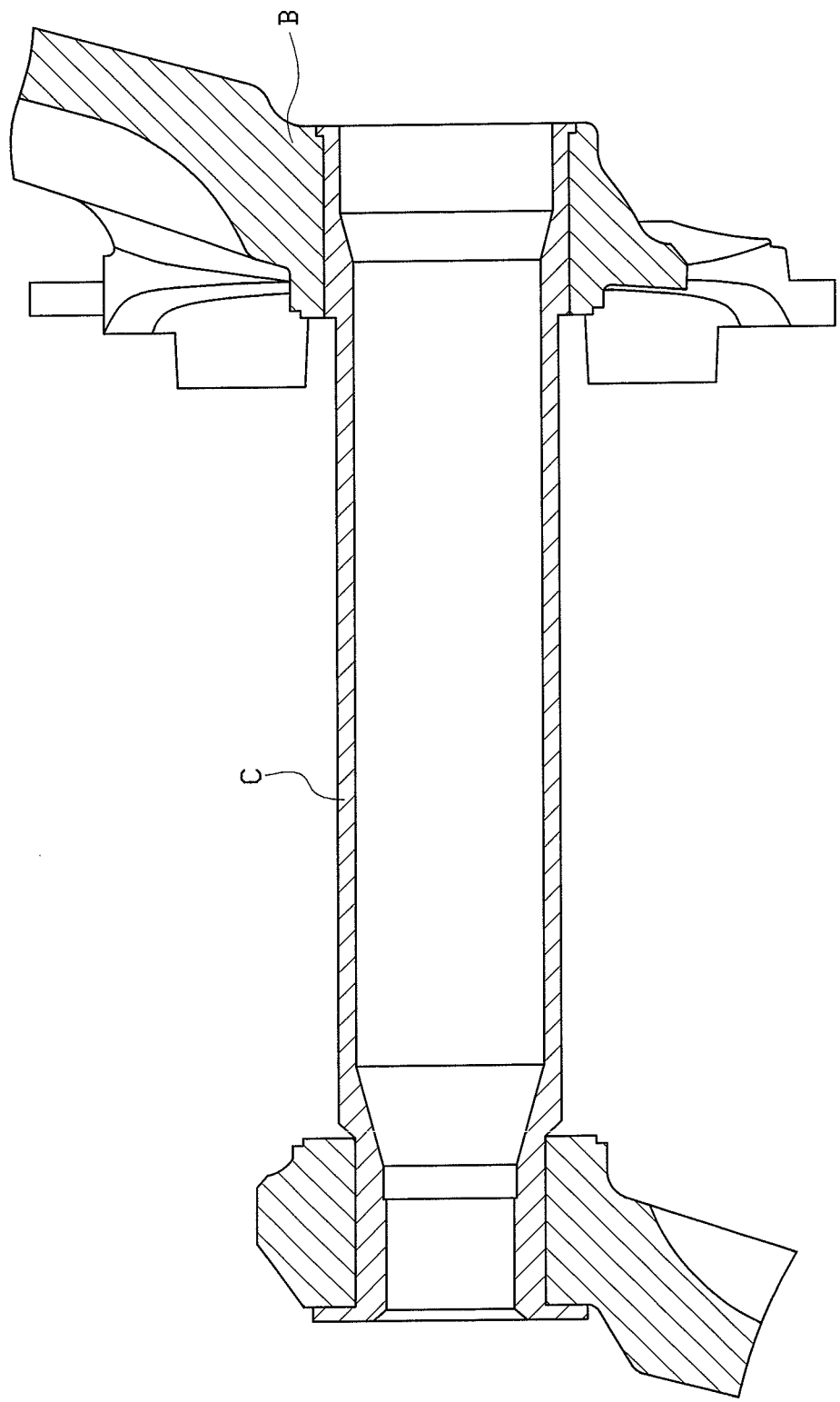
FIG. 12 is a cross sectional view of the conventional bicycle crank assembly.
Figure 13:
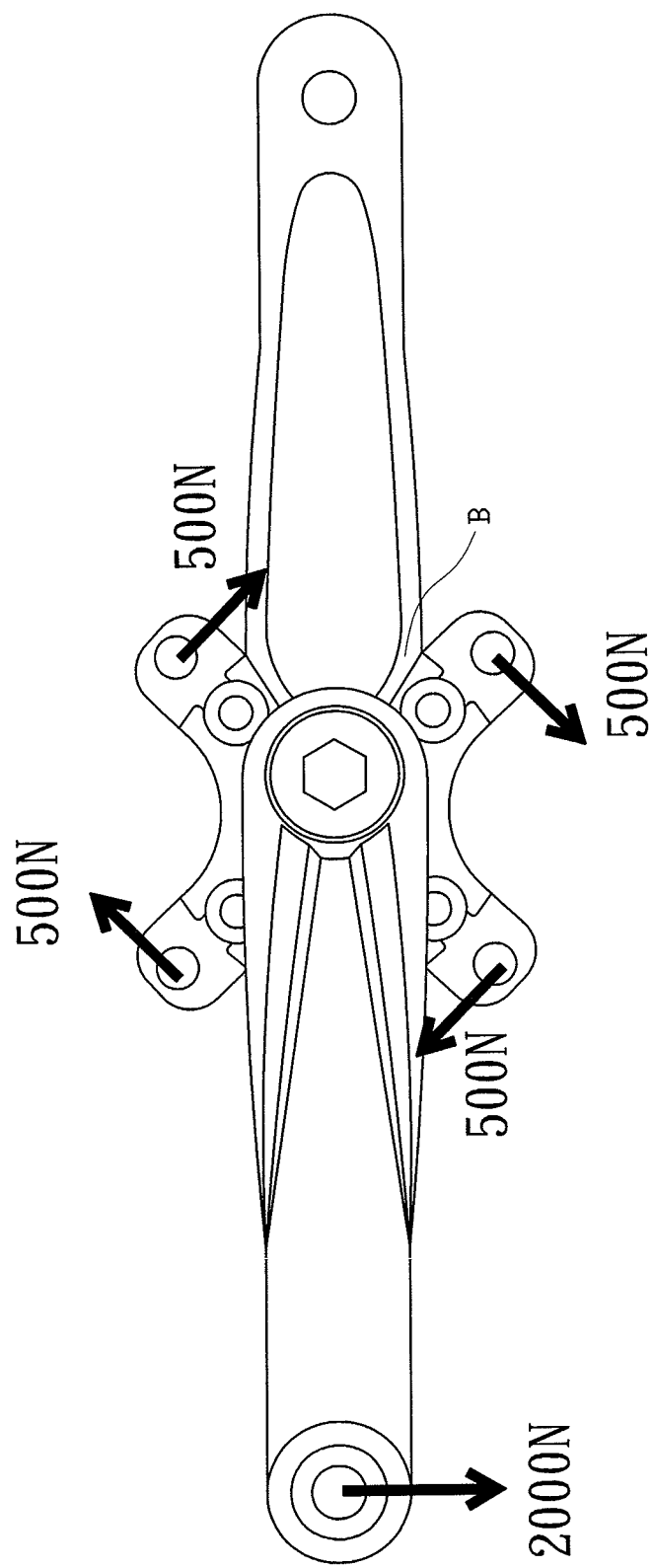
FIG. 13 shows the forces applied to the crank of the conventional bicycle crank assembly.
Figure 14:
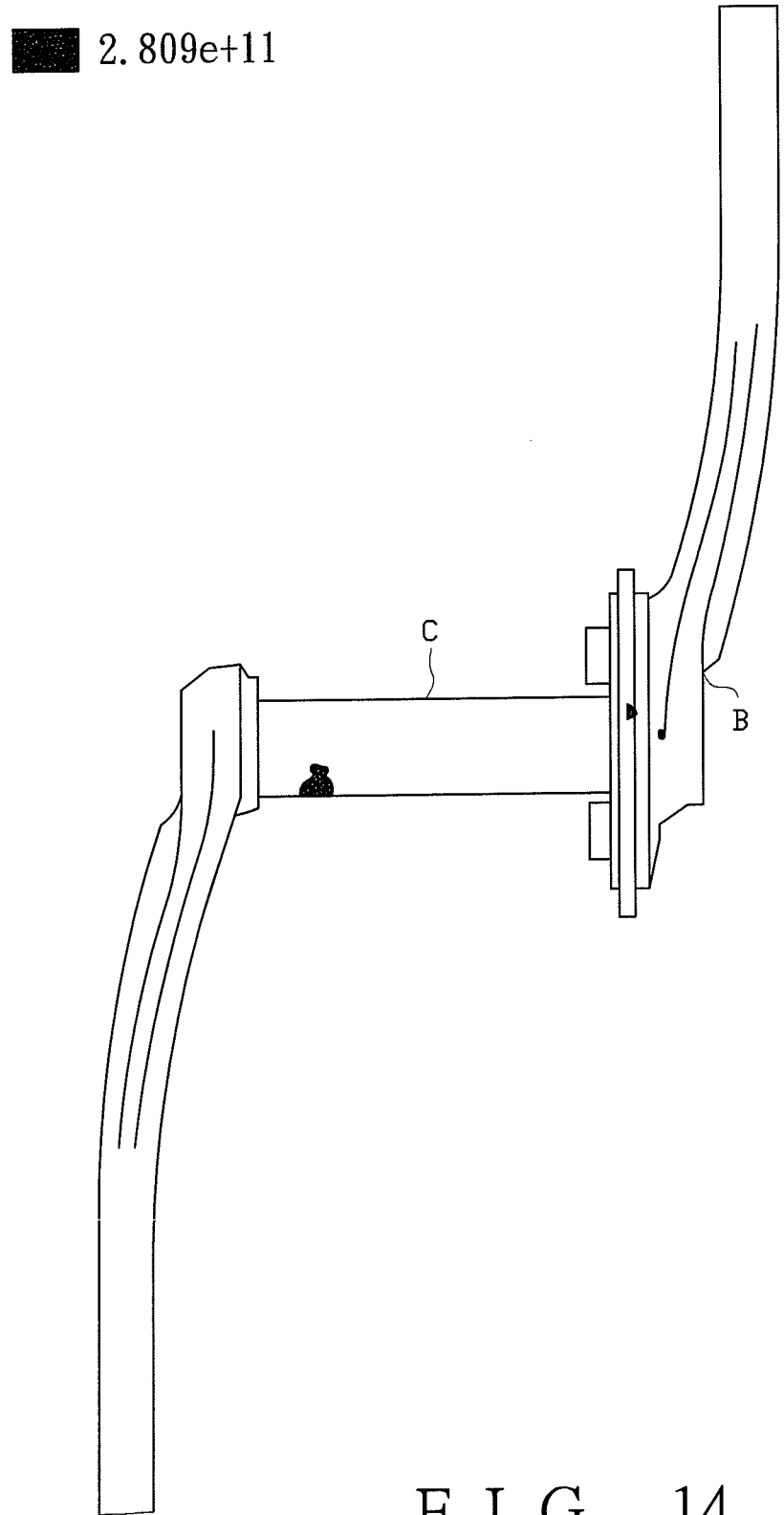
FIG. 14 is a perspective view to show the maximum stresses distributed on the outside of the conventional bicycle crank assembly.
Figure 15:
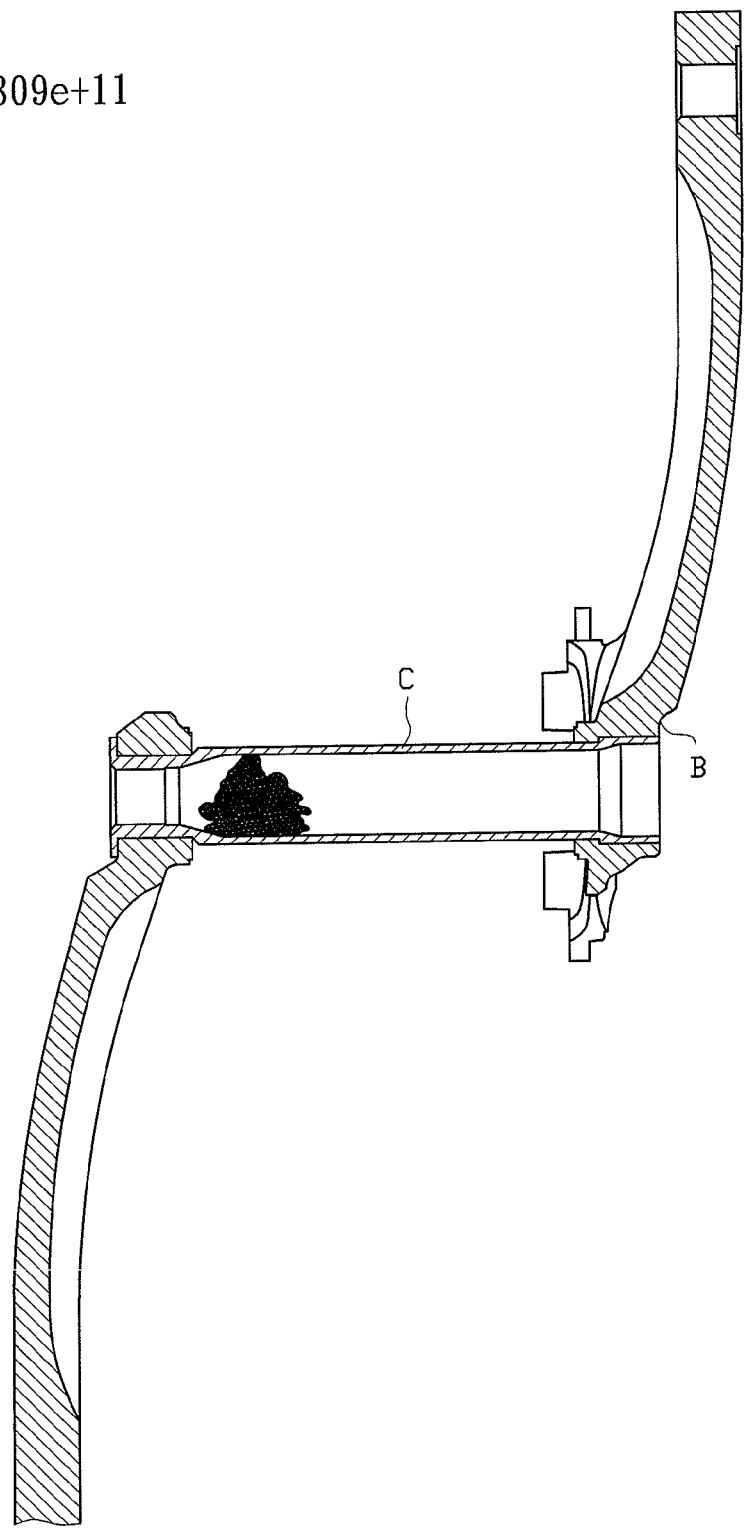
FIG. 15 is a cross sectional view to show the maximum stresses distributed on the inside of the conventional bicycle crank assembly.
Figure 16:
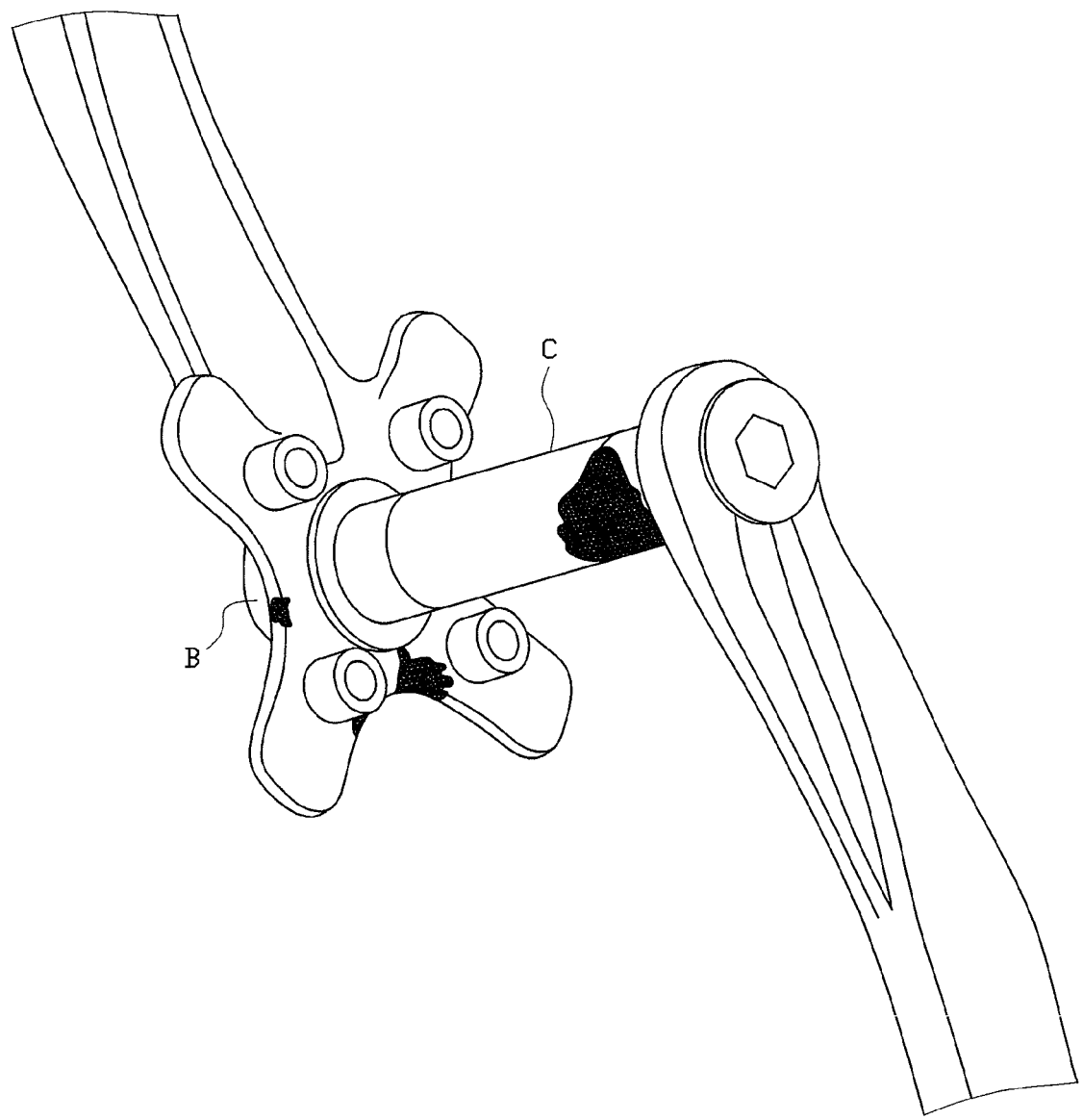
FIG. 16 is another perspective view opposite the viewing surface of FIG. 14 to show the maximum stresses distributed on the outside of the conventional bicycle crank assembly.
Figure 17:
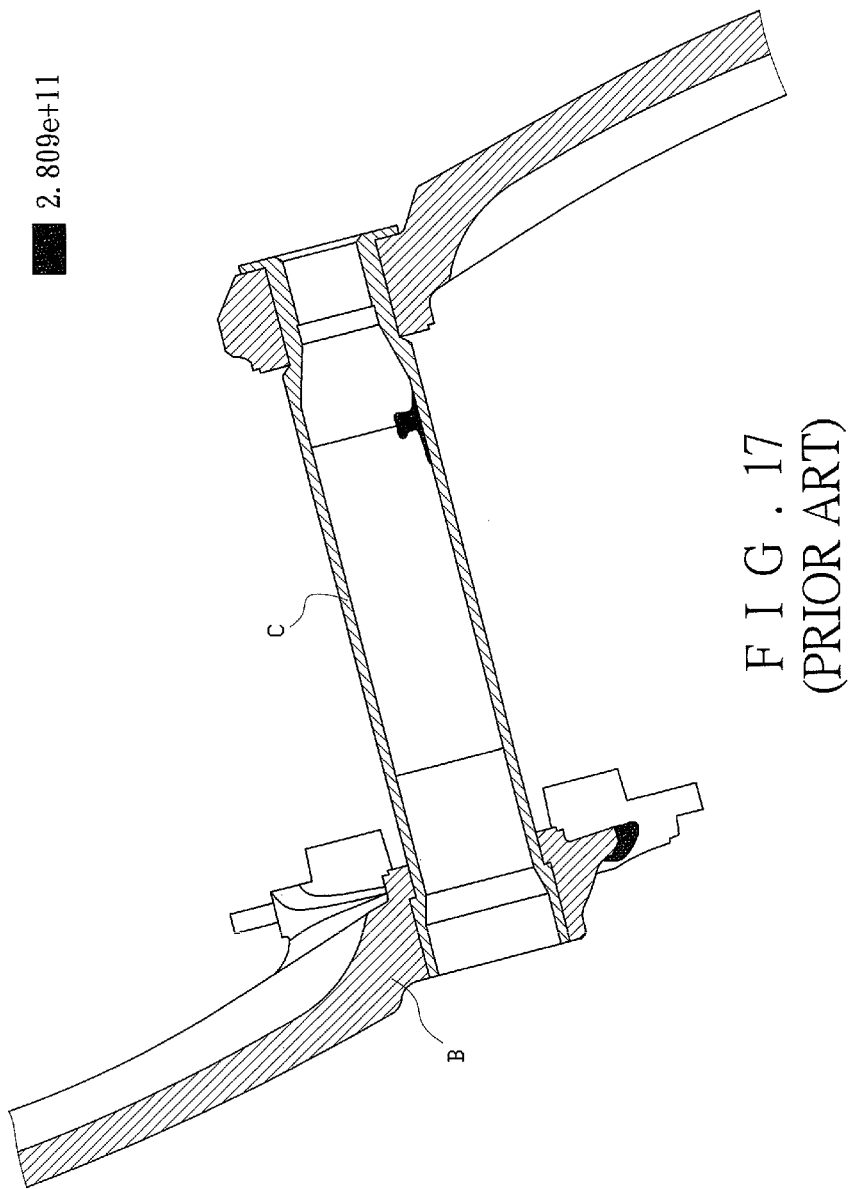
FIG. 17 is another cross sectional view opposite the viewing surface of FIG. 15 to show the maximum stresses distributed on the conventional bicycle crank assembly.

When in assembling, as shown in FIGS. 2 to 4, a connecting tube "A" has a first sleeve "D", a second sleeve "E" and two bearings "F" received therein. The first sleeve "D" is connected to the second sleeve "E", and the two bearings "F" secure the first sleeve "D" and the second sleeve "E" in the connecting tube "A". Preferably, the first sleeve "D" is threadedly connected to the second sleeve "E". The axle 2 extends through the first hole 11 of the first crank 1, the first sleeve "D", the second sleeve "E" and the two bearings "F". The third end of the axle 2 is connected to the first hole 11. The O-ring 25 contacts the first stop 17 of the first crank 1 so as to prevent corrosive liquid, such as rain and perspiration, from entering the connecting tube "A". The first protrusion 14 is securely connected to the fixing portion 23, and the first and second restriction faces 16, 27 are matched with each other. The first protrusion 14 and the fixing portion 23 are connected to each other. Preferably, the first protrusion 14 and the fix portion 23 have spline/rack-like features thereon so as to have a larger contact area which is benefit for bearing larger force. The first and second restriction faces 16, 27 are snugly matched to each other so that the stresses, which are generated by exerting forces on the first and second cranks 1, 3 and is transforming to the axle 2, can be divided into an axial force and a radial force by the rounded faces of the restriction faces 16, 27. Accordingly, most of the stresses originally applied on the axle 2 are shared to the first crank 1 by the connection of the first protrusion 14 and the fixing portion 23 and the connection of the restriction faces 16, 27. Hence, the axle 2 of the present invention (as FIGS. 5 to 10 shown) bears less stresses and is much more durable than that of the conventional embodiment (as FIGS. 11-17 shown). Wherein, the longitudinal force is sufficient to securely combine the parts. Further, the fourth end 22 of the axle 2 extends through the second hole 31 of the second crank 3. The locking member 29 is threadedly connected to the threaded hole 28 and contacts the second stop 34 of the fifth open end 32 to install the cranks 1, 3 and the axle 2 to the connecting tube "A". Consequently, some of the stresses of the axle 2 are shared to the second crank 3.

While we have shown and described the embodiment in accordance with the present invention, it should be clear to those skilled in the art that further embodiments may be made without departing from the scope of the present invention.

What is claimed is:

1. A bicycle crank assembly, comprising:

a first crank having a first hole, the first hole having a first open end and a second open end opposite the first open end, a first protrusion extending from an inner periphery of the first open end, a second protrusion extending from the first protrusion, the second protrusion having a first restriction face at the second open end, a first stop defined in an inner periphery of the first open end, and an axle extending through the first crank and having a third end and a fourth end opposite the third end, the third end having a fixing portion on an outside thereof, the fixing portion having a recessed portion defined in a connection area with the axle, the recessed portion having a second restriction face which contacts the first restriction face, the first and second restriction faces being matched with each other by two respective curved portions, the fixing portion having a groove and an O-ring engaged with the groove, the O-ring contacting the first stop.

2. The bicycle crank assembly as claimed in claim 1, wherein the first crank has a first crank body extending therefrom.

3. The bicycle crank assembly as claimed in claim 1, wherein the axle is a hollow axle.

4. The bicycle crank assembly as claimed in claim 1, wherein the fourth end has a threaded hole and a locking member is threadedly connected to the threaded hole.

5. The bicycle crank assembly as claimed in claim 4, further comprising a second crank, wherein the second crank is fixed to the fourth end of the axle and has a second hole, the second hole has a fifth open end and a sixth open end opposite the fifth open end, the fifth open end has a second stop contacting to the locking member, the second crank has a second crank body extending therefrom.

6. The bicycle crank assembly as claimed in claim 1, further comprising a second crank fixed to the fourth end of the axle.

* * * * *